(12) United States Patent
Sreekanti

(10) Patent No.: US 6,370,604 B1
(45) Date of Patent: Apr. 9, 2002

(54) HOT REPLACEMENT OF STORAGE DEVICE IN SERIAL ARRAY OF STORAGE DEVICES

(75) Inventor: Kumar Sreekanti, Milpitas, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/307,301

(22) Filed: May 7, 1999

(Under 37 CFR 1.47)

(51) Int. Cl.⁷ ................................................ G06F 13/00
(52) U.S. Cl. .............................. 710/103; 710/6; 710/8; 710/39; 710/52; 711/114; 714/5
(58) Field of Search ..................... 710/1–11, 15–19, 710/36–45, 52–56, 100–103, 107–114, 129–131; 711/111–114; 709/224; 714/5–6

(56) References Cited

U.S. PATENT DOCUMENTS

| | | | | |
|---|---|---|---|---|
| 5,257,393 A | * | 10/1993 | Miller | 709/224 |
| 5,553,231 A | * | 9/1996 | Papenberg et al. | 714/5 |
| 5,600,783 A | * | 2/1997 | Kakuta et al. | 714/6 |
| 5,941,972 A | * | 8/1999 | Hoese et al. | 710/129 |
| 6,092,215 A | * | 7/2000 | Hodges et al. | 714/6 |
| 6,192,484 B1 | * | 2/2001 | Asano | 714/6 |
| 6,223,252 B1 | * | 4/2001 | Bandera et al. | 711/114 |
| 6,247,079 B1 | * | 6/2001 | Papa et al. | 710/113 |
| 6,249,842 B1 | * | 6/2001 | Buch | 711/114 |
| 6,272,573 B1 | * | 8/2001 | Coale et al. | 710/100 |

* cited by examiner

Primary Examiner—Christopher B. Shin
(74) Attorney, Agent, or Firm—Oppenheimer Wolff & Donnelly LLP

(57) ABSTRACT

Hot replacement of a storage device in a serial array of storage devices. The apparatus and the process of the invention allow one device to be removed from the array, without causing critical error to be delivered to the host computer and, in turn, all of the delays and problems associated with the delivery of such an error signal. The invention includes a buffer to buffer data requests from the host computer while the replacement process is ongoing. After the drive is replaced, the requests stored in the buffer are performed.

16 Claims, 3 Drawing Sheets

PRIOR-ART

PRIOR-ART

HOT REPLACEMENT OF STORAGE DEVICE IN SERIAL ARRAY OF STORAGE DEVICES

BACKGROUND OF THE INVENTION

1. Field of the Invention

This invention relates to the replacement of a storage device in a serial array of storage devices and, more particularly, to the replacement of such a device while the computer to which the array is attached continues to make requests to the array for the storage or retrieval of data.

2. Description of Related Art

It is well known to construct a data storage device using a plurality of disk drives. Such a configuration is typically referred to as a RAID, meaning a redundant array of inexpensive drives.

The advantages of such a configuration are also well known. The size of the storage device can be incrementally and inexpensively increased by simply adding another disk drive. The speed of data and retrieval is also markedly enhanced by distributing the data over several drives in the array and operating those drives simultaneously or nearly simultaneously.

On the other hand, a storage array containing a plurality of drives has far more moving parts than a single large drive, potentially increasing the likelihood of a failure.

In many embodiments, each drive in the array is connected in parallel to a common bus. When one drive fails, the remaining drives are often still able to fully satisfy data requests from the host computer to which the array is attached. This is attributable to the creation and recordation of parity data. If the failed drive was merely storing parity data, that data is redundant and is not needed, if the other drives are still functioning. Conversely, if the failed drive was storing data, the missing data can be recreated from the data and parity information on the remaining drives. As a result, a malfunction in one of the drives in an array of drives connected in parallel does not usually interrupt the data operations of the host computer to which the array is attached.

Of course, it is highly desirable to replace the malfunctioning drive as soon as possible. Otherwise, a later error in one of the other drives will not be able to be corrected.

A process known as "hot swapping" is often used to replace a malfunctioning drive in a parallel array. While the host computer continues to send data requests to the array, the malfunctioning drive is removed and replaced by a new functioning drive. The array then returns to its normal function of storing and retrieving data, with parity protection. Significantly, the operations of the host computer are not disrupted throughout the entire process.

The consequences are usually far different if the drives in the array are serially connected. In some configurations, the data must flow into and out of the connection to one drive, before it can be received by some or all of the remaining drives. This is known as a serial connection. This exists in connection with several drive topologies, such as in connection with the SSA architecture, fiber channels, and drive configurations in which the data signal must pass through connectors mounted in each drive.

When an array of drives are serially connected, a malfunction in a single drive still does not usually disrupt the operation of the host computer. If it were storing parity data, the data is still redundant and not needed. If it were storing data, the missing data can still be recreated from the data and parity information on the other drives.

Unless the malfunctioning drive is the last drive in the serial array, however, its replacement will usually cause significant disruption in the operation of the host computer. As soon as it is removed, its removal will prevent at least one other drive in the array from receiving and processing data requests. Since most arrays are not able to continue functioning without two or more of their drives, an error message will be immediately sent to the host computer. In turn, this error message will often initiate error recovery routines in the host computer and, ultimately, the cessation of data storage and retrieval operations in the host computer. In some systems, such an error will ultimately stop the host computer from processing, requiring the computer in some systems to be completely rebooted. Not only is valuable time lost, but damage to data can occur.

In short, the replacement of a malfunctioning drive in an array of drives that are serially connected often interferes materially with the operation of the host computer to which the array is attached, which is often highly undesirable.

SUMMARY OF THE INVENTION

The invention allows a storage device in an array of storage devices connected in series to be replaced without interfering with the operation of the host computer to which the array is attached.

In one embodiment of the invention, the invention provides a hot replacement process for replacing a to-be-replaced data storage device in an array of data storage devices serially connected to one another while the array continues to receive requests for the storage or retrieval of data from a host computer to which the array is connected. The process includes: buffering the requests while the to-be-replaced storage device is being replaced; deferring the processing of the requests while they are being buffered; replacing the to-be-replaced storage device with another storage device while the requests are being buffered; and processing the buffered requests after the to-be-replaced storage device has been replaced by the other storage device.

Another embodiment of the invention includes: the process of signaling that the to-be-replaced storage device is about to be replaced; completing any request that is in the process of being fulfilled at the time of the signaling; after any request that was in the process of being fulfilled at the time of the signaling has been completed, initiating the buffering of the requests and the deferring of the processing of the requests; and signaling that it is safe to remove the to-be-replaced storage device from the array for replacement.

The invention contemplates that the foregoing processes will be used in connection with some or all of the requests that are generated by the host computer to which the array is attached.

In a still further embodiment of the invention, a software driver is used to effectuate a portion of the process. In one embodiment, the software driver is loaded in the host computer. In another embodiment, the software driver is loaded in the storage array. The invention contemplates that the process be used in connection with storage arrays containing hard disk drives, as well as other types of storage devices.

Another embodiment of the invention includes a data and storage and retrieval system. The system includes: an array of data storage devices serially connected to one another for receiving requests for the storage or retrieval of data from a computer; a buffer for buffering the requests from the computer; and a processor associated with the buffer and the array for causing the buffer to buffer the requests from the computer while one of the storage devices is being replaced, causing the processing of the requests to be deferred while they are being buffered, and causing the buffered requests to be processed after the storage device has been replaced.

The invention contemplates that the processor will buffer and defer some or all of the requests that are being received from the computer while the storage device is being replaced.

Another embodiment of the invention includes a replace device notifier for notifying when it is safe to remove the storage device from the array. In this embodiment, the processor further receives a signal that the storage device that is about to be replaced, causes any request that is in the process of being fulfilled at the time of the signaling to be completed and, after any request that was in the process of being fulfilled at the time of the signaling is completed, initiates the buffering of the requests by the buffer and the deferring of the processing of the requests, and causes the notifier to notify that it is safe to remove the storage device from the array.

In a still further embodiment of the invention, the processor includes a software driver, configured to be loaded in the computer and/or in the array.

The invention is also applicable to the replacement of any component in a data storage device while the device continues to receive requests for the storage or retrieval of data from a host computer to which the device is connected. While the to-be-replaced component is being replaced, the requests are buffered and their processing is deferred. The component is replaced while the requests are being buffered and the buffer requests are processed after the to-be-replaced component has been replaced.

A still further embodiment of the invention includes a data storage and retrieval system that includes a data storage device for receiving requests for the storage or retrieval of data from a computer, and the storage device includes a component necessary for the operation of the device. It further includes a buffer for buffering the requests from the computer while the device is being replaced, and a processor associated with the buffer in the storage device for causing the buffered requests to be processed after the component has been replaced.

These as well as still further features, objects and benefits of the present invention will now become clear upon an examination of the attached drawings and the following description of the preferred embodiments.

DETAILED DESCRIPTION OF THE PREFERRED EMBODIMENTS

Figure 1:
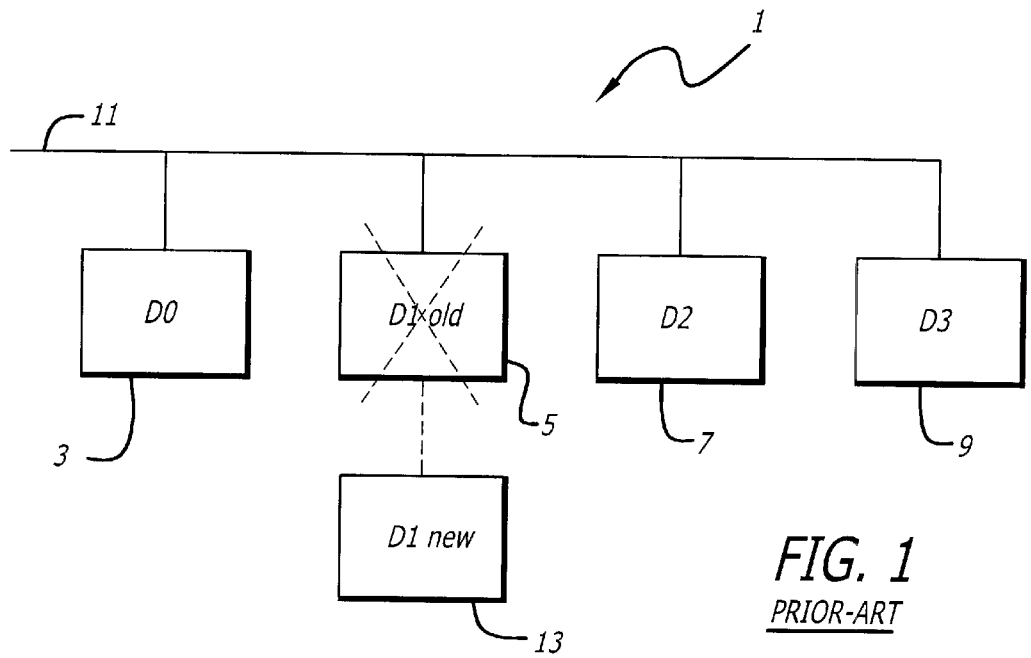
FIG. 1 is a block diagram illustrating a prior art parallel array of storage devices and the replacement of one of those devices.

FIG. 1 is a block diagram illustrating a prior art parallel array of storage devices and the replacement of one of those devices. As shown in FIG. 1, a parallel array of storage devices 1 contains storage devices 3, 5, 7 and 9. All of the drives in the array are connected in parallel to a host computer (not shown) over a bus 11.

During the operation of the array 1, one of the storage devices may malfunction, such as the storage device 5. However, this does not usually interfere with the operation of the host computer because the array 1 is specifically design to function without one of its storage devices. As is well known in the art, one of the storage devices stores parity information. If the malfunctioning device is the one that is storing the parity information, the array can still function without the parity information because it is redundant. If the array that has malfunctioned was storing data, the missing data can be recreated from the data and parity information that is stored on the other drives.

An array of the type shown in FIG. 1 often allows the malfunctioning device to be replaced while the remaining devices and the host computer continue to function. The malfunctioning drive, such as the storage device 5, is mechanically removed from the array, and a replacement storage device, such as a storage device 13, is inserted in its place.

Throughout this "hot swapping" process, the array 1 continues to function without interfering with the operation of the host computer to which it is attached.

Figure 2:
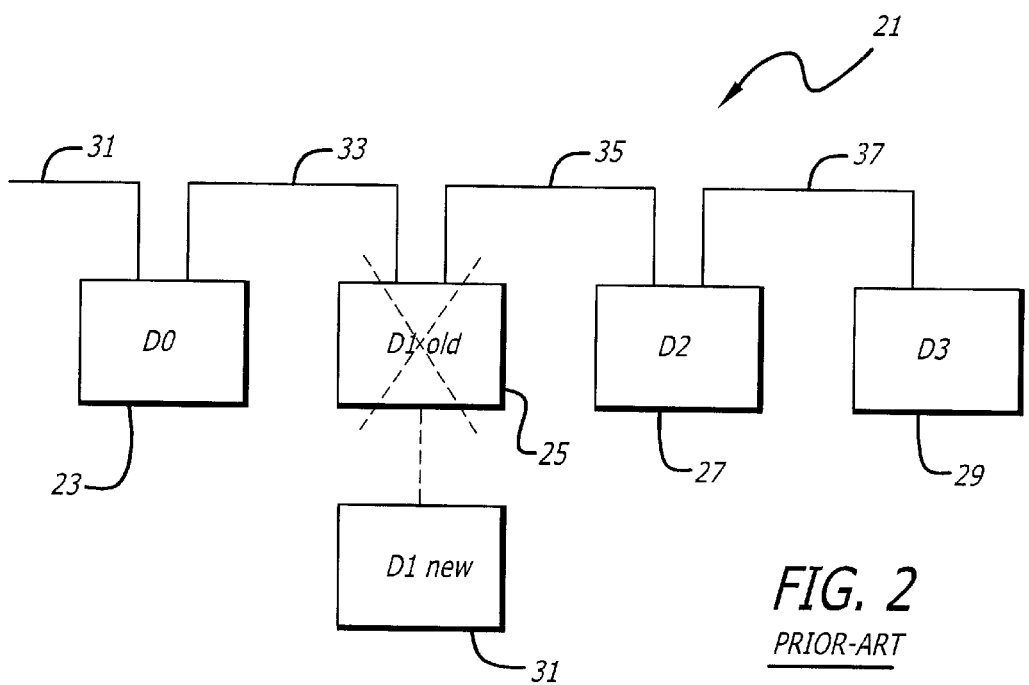
FIG. 2 is a block diagram illustrating a prior art serial array of storage devices and the replacement of those devices.

FIG. 2 is a block diagram illustrating a prior art serial array of storage devices and the replacement of one of those storage devices.

As shown in FIG. 2, a serial array of storage devices 21 includes drives 23, 25, 27 and 29. Unlike the array 1 shown in FIG. 1, however, the drives in the array 21 shown in FIG. 2 are serially connected through serial connections 31, 33, 35, and 37.

The host computer (not shown) is connected to the serial connection 31. In order for a data request (or response) to be received by (from) drive 25, it must first pass through drive 23. Similarly, all data requests to (or responses from) drive 27 must first pass through drives 23 and 25. Similarly, all data requests to (or responses from) drive 29 must first pass through drives 23, 25 and 27.

Serial connections of this type are found in a broad variety of configurations. For example, the data requests (and responses) may need to travel in a serial fashion through a chain of cables, each one of which terminates in a connector on each drive. Other instances in which the data must serially flow occur in an SSA channel or fiber channel.

In a serial configuration, a single malfunctioning drive still does not usually interfere with the operation of the host computer to which the array is attached. Although the drive may not be functioning, data requests (or responses) to (from) the other drives still pass through it.

A problem arises, however, when an attempt is made to replace the malfunctioning drive. For example, if the drive 25 in FIG. 2 malfunctions, data requests to (and responses from) the drives 27 and 29 are interrupted while the malfunctioning drive 25 is removed.

Although the connection will be restored when a replacement drive 31 is inserted in the location of the removed drive 25, the array 21 will generate errors in response to any data requests to drives 27 and 29 that arrive from the host computer between the time that the malfunctioning drive 25 is removed and the replacement drive 31 is inserted. Arrays of this type simply do not usually have the ability to continue operations when two or more of its drives are not functioning.

The result of these errors can be quite serious. A complex error-correction routine may be initiated in the host computer. The host computer may even shut down. It may also have to be rebooted before operations can again take place. In addition to substantial, expensive and disruptive down time, valuable data can be lost or damaged.

Figure 3:
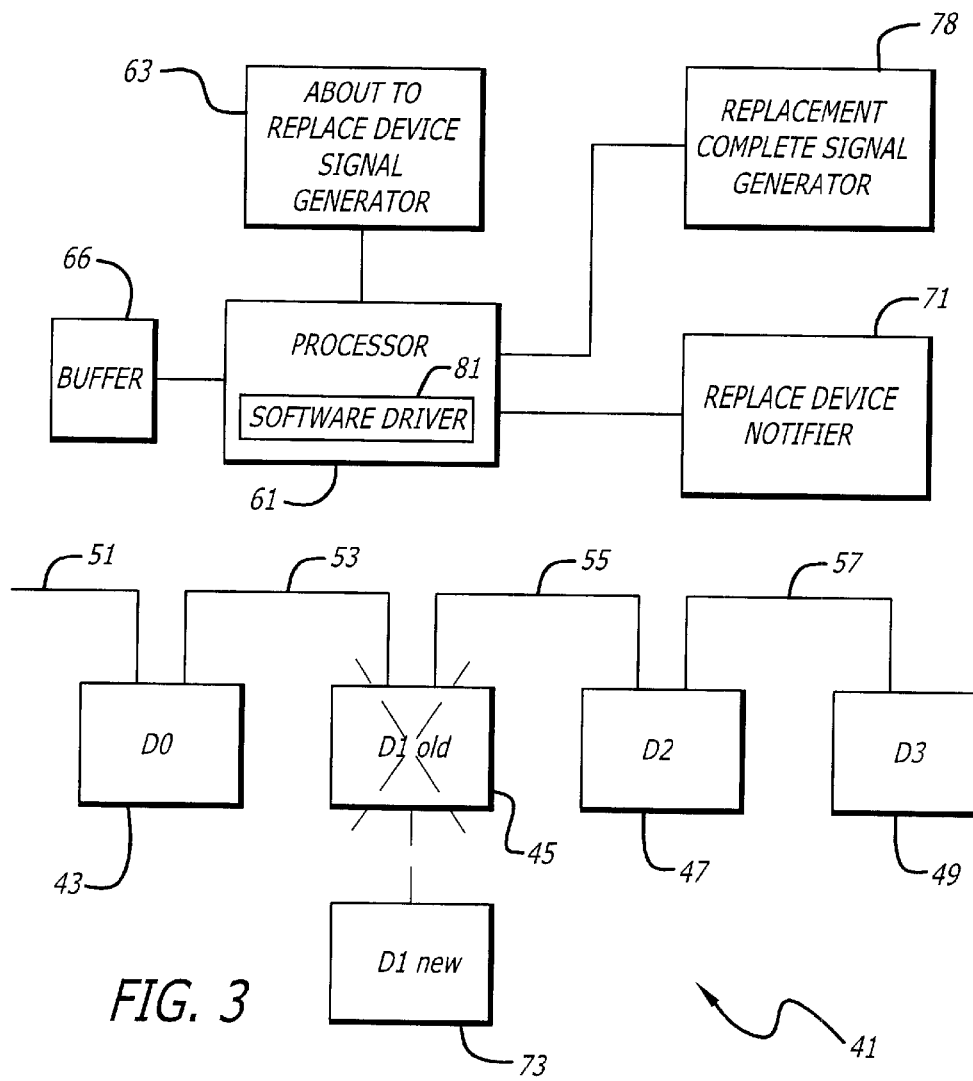
FIG. 3 is a block diagram of apparatus that implements one embodiment of the present invention.
Figure 4:
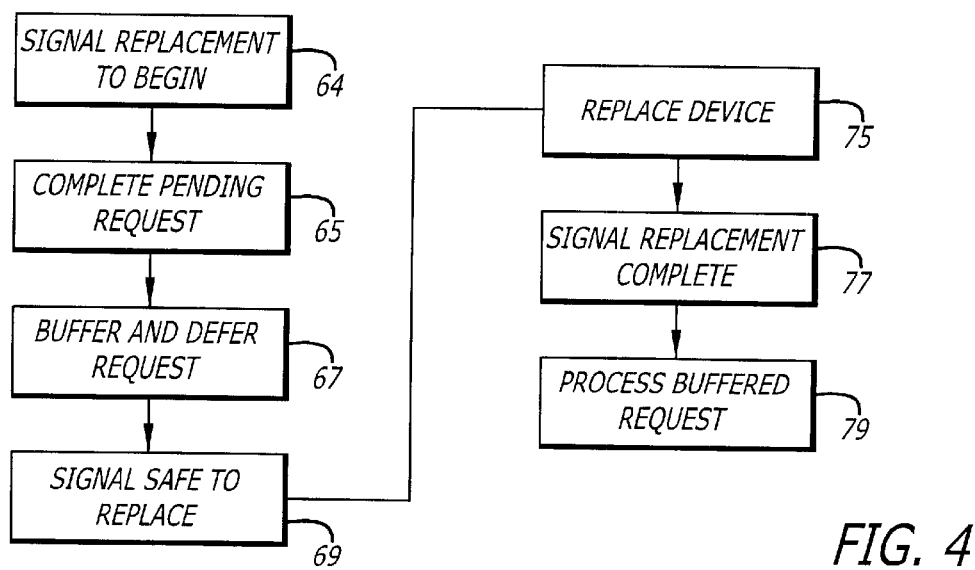
FIG. 4 is a block diagram of one embodiment of the process implemented by the apparatus shown in FIG. 3.

FIG. 3 is a block diagram of one embodiment of apparatus that implements the present invention. FIG. 4 is a block diagram of one embodiment of the process implemented by the apparatus shown in FIG. 3. The composition and operation of this embodiment will now be made clear by a discussion of both of these figures.

As shown in FIG. 3, the invention includes an array of drives 43, 45, 47 and 49, serially connected through serial connections 51, 53, 55 and 57. The host computer (not shown) delivers requests for the storage or retrieval of data to the serial connection 51. Responses to those requests can be received through the same serial connection 51 or, in an alternative embodiment, through a separate connection (not shown). The components which have thus far been described are the same as those shown in FIG. 2.

During the operation of this array of serially-connected drives, it may become desirable to be replace one of the drives, such as drive 45. The invention embraces all reasons for the replacement. One such reason is when the drive has malfunctioned. Another reason is when it is suspected that the drive will malfunction. Still further reasons include a desire to replace the drive with a faster or larger one.

When the replacement drive is in hand and the replacement operation is ready to proceed, a processor 61 receives a signal from an About To Replace Device Signal Generator 63 that a drive is about to be replaced, as illustrated in a Signal Replacement To Begin block 63, shown in FIG. 4. The invention embraces all types of About To Replace Device Signal Generators 63. One example is a mechanical switch located in the vicinity of the array, the host computer or elsewhere. Another example is a sense switch associated with the drive to be replaced that is triggered as the drive bay is being accessed or the drive is about to be removed. A still further embodiment generates this signal following input from a keyboard or other input device to the host computer or the array.

After an About To Be Replaced signal is received by the processor 61, the processor checks to determine whether a data request is in the process of being fulfilled. If it is, the processor 61 continues to allow the data request to be fulfilled, as reflected in a Complete Pending Request block 65 in FIG. 4. The purpose of this step is to insure that a data request is not inadvertently interrupted mid-stream, causing the undesirable generation of an error signal to the host computer and/or damage to data.

In some embodiments of the invention, it is possible that more than a single data request will be pending at the time the about to be replaced device signal is received. In this instance, all of the pending data requests would preferably be completed before proceeding to the next step.

After all pending data requests are completed, the processor 61 engages a buffer 66 to begin storing all further data requests and, at the same time, defers the performance of all future data requests, as illustrated in a Buffer And Defer Request block 67 in FIG. 4. The purpose of this step is to insure that data requests from the host computer are not lost during the replacement process. At the same time, the processor 61 insures that attempts to process requests are not made during the replacement process, thus preventing the generation of an error to the host computer and the associated problems that such an error would be likely to cause.

The invention embraces all variations of the buffer 66. In one embodiment, the buffer 66 is a separate memory device in the array, such as a RAM, hard drive, or a combination of both. In a still further embodiment, the buffer 66 is RAM in the host computer or other storage media associated with the host computer. In a still further embodiment, the buffer 66 is separate from both the array and the host computer.

Of course, it is important that the buffer 66 be large enough to hold all of the data requests that may be received during the replacement process. In some embodiments, the number of the buffered requests will be limited by the configuration of the embodiment. For example, when a SCSI interface is used, most computers will only generate a maximum of two hundred fifty-six unprocessed requests. In other configurations, however, there will be no limit. Estimates will need to be made based on the speed of the host, the kind of activity the host is managing, and the anticipated amount of time needed to switch in a new drive.

The next step in the process is for the processor 61 to signal that it is now safe to replace the drive, as shown in a Signal Safe to Replace block 69 of FIG. 4. One approach for doing this is to send a safe to replace signal to a Replace Device Notifier 71, as shown in FIG. 3.

The invention embraces all types of Replace Device Notifiers. In one embodiment, the notifier 71 is an LED or other type of light on the device array. In another embodiment, it is a device that produces an audible sound. In a still further embodiment, it is the display of visual information on the display at the host computer or on a separate display associated with the array. In a still further embodiment, it is a sound generating device associated with the host computer.

As further protection, a mechanical interlock device (not shown) may be provided that prevents the removal of the drives in the array during periods when the Replace Device Notifier 71 is not actuated.

Once the Replace Device Notifier 71 is actuated, the drive to be replaced 45 is removed from the array 41 and replaced by a new drive 73, as shown in FIG. 3 and as illustrated in a Replace Device block 75 in FIG. 4.

Once the replacement operation is complete, the processor 61 is provided with a replacement complete signal, as shown in a Signal Replacement Complete block 77 in FIG. 4. The invention embraces all techniques for generating this signal. In one embodiment, the signal is generated by depressing a Replacement Complete Signal Generator switch 78, as shown in FIG. 3. This may be a mechanical switch located in the array, located in the host computer or located elsewhere. It may also be a switch that is activated by the insertion of the replacement drive. It may also be keyboard input to the host computer.

Upon receiving the replacement complete signal, the processor then causes the requests that are stored in the buffer 66 to be processed in their normal manner, as reflected by a Process Buffered Requests block 79 in FIG. 4. During this operation, of course, new data requests may be received from the computer. In one embodiment, these new requests would be buffered until the processing of the old request has been completed. In another embodiment, the processing of some or all of the new requests could take priority over the processing of some or all of the old requests, if desired.

The result of the configurations which have thus far been described is to insure against the delivery of a fatal error signal to the host computer while a drive in the serial array is being replaced.

The invention embraces a broad variety of variation in the components and the process steps that have thus-far been described. The processor 61, for example, may be implemented by hardware, software, firmware, or by a combination of these, as is well known in the art. It may be located in the array, in the host computer, at some other location, or in a plurality of these locations with the various functions of the processor being distributed across the locations.

Figure 5:
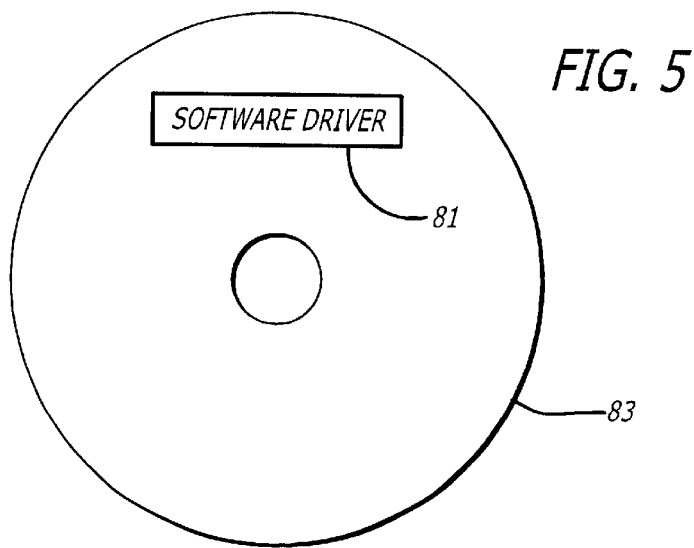
FIG. 5 is one embodiment of a data storage device containing the software driver shown in FIG. 3.

In one embodiment, the processor 61 includes a software driver 81, as shown in FIG. 3. The driver 81 is used to perform or cause the performance of at least some of the processor functions. It is configured to be loaded in the host computer, the array, or at some other location, or is configured to be loaded in a plurality of these locations with various functions being distributed over its different segments. For distribution purposes, the software driver 81 may be stored on a data storage device, such as a CD-ROM 83, as shown in FIG. 5. Of course, it may also be stored on other types of storage devices, such as a floppy disk, hard disk drive, tape, etc.

Although having been thus far illustrated as containing only four drives, the invention is applicable to storage arrays containing any number of drives. The invention is also applicable to storage arrays containing storage devices other than hard disk drives, such as CD-ROMS or tapes.

Although the process of the invention has thus far been described as following a certain sequence, it is also to be understood that the invention embraces other sequences, as well. Further, the invention embraces configurations which have additional process steps and which omit certain of the process steps that have been described.

Figure 6:
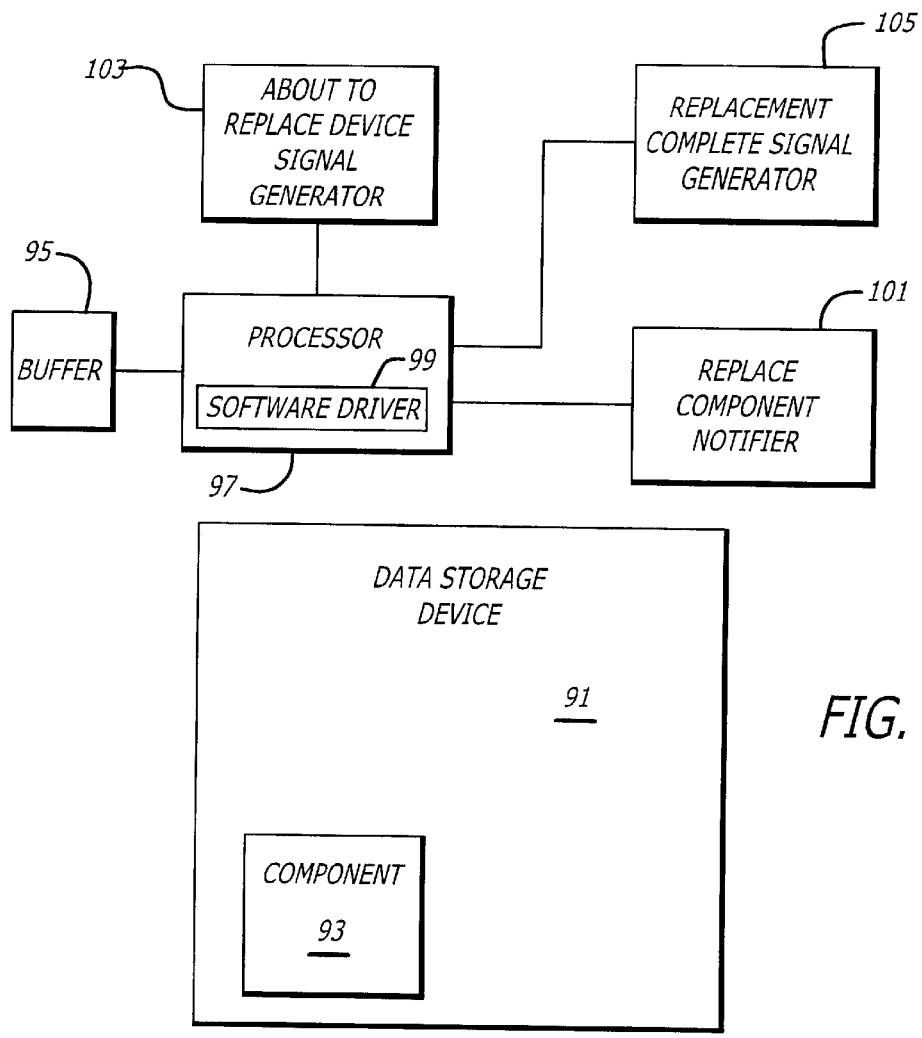
FIG. 6 is a block diagram of another embodiment of apparatus that implements the process of the invention shown in FIG. 4.

The invention also embraces the replacement of a component in a data storage device, other than a storage device itself. FIG. 6 is a block diagram of another embodiment of apparatus that implements the process of the invention shown in FIG. 4. As shown in FIG. 6, this embodiment includes a data storage device 91 containing a component 93 that is critical to the operation of the data storage device. It also includes a buffer 95, processor 97, a portion of which may be implemented by a software driver 99, a Replace Component Notifier 101, an About to Replace Device Signal Generator 103 and a Replacement Complete Signal Generator 105.

Each of the components shown in FIG. 6 operates in the same manner as their corresponding component in FIG. 3 and in accordance with the process described in FIG. 4. The invention also embraces all of the variations in the components shown in FIG. 6 as were discussed above in connection with their corresponding components in FIG. 3.

The principal difference between the configurations of the invention shown in FIG. 3 and FIG. 6 is that the component to be replaced in FIG. 6 is not necessarily a storage device, as shown in FIG. 3. Instead, the component 93 may be any of the components in the storage array that are critical to the operation of the array, such as a fan, power supply, etc. The same concept of the invention applies to each. Instead of causing the potentially-harmful delivery of a critical error signal to the host processor while the component 93 is being replaced, data requests from the host computer are buffered and deferred during the replacement process.

Unlike the embodiment shown in FIG. 3, however, a failure of a component 93 shown in FIG. 6 may immediately cause the delivery of a critical error signal to the host computer, even before the component 93 is removed and replaced. In such a case, the component 93 must usually be removed and replaced prior to its failure. One of the several well-known technologies to detect an anticipated failure of the component 93 may advantageously be used to identify the component before its failure, thus facilitating application of the present invention.

A still further embodiment of the present invention can advantageously be used in the configuration shown in FIG. 6, even after the component 93 has failed. In this embodiment, the failure of the component is itself used to generate the about-to-replace signal that is delivered to the processor 97 and, in turn, causes further data requests to be buffered. In this embodiment, of course, the size of the buffer 95 must be sufficient to buffer all of the subsequent requests that may be received before the component 93 is able to be replaced.

The invention also contemplates a broad variety of additional embodiments, features and benefits, and is limited solely by the claims that now follow.

What is claimed is:

1. A hot replacement process for replacing a to-be-replaced data storage device in an array of data storage devices serially connected to one another while the array continues to receive requests for the storage or retrieval of data from a host computer to which the array is connected, comprising:
    a) buffering the requests while the to-be-replaced storage device is being replaced;
    b) deferring the processing of the requests while they are being buffered;
    c) replacing the to-be-replaced storage device with another storage device while the requests are being buffered; and
    d) processing the buffered requests after the to-be-replaced storage device has been replaced by the other storage device.

2. The hot replacement process of claim 1 further comprising:
    a) signaling that the to-be-replaced storage device is about to be replaced;
    b) completing any request that is in the process of being fulfilled at the time of said signaling; and
    c) after any request that was in the process of being fulfilled at the time of said signaling has been completed:
        i) initiating
            a) said buffering of the requests; and
            b) said deferring of the processing of the requests; and
        ii) signaling that it is safe to remove the to-be-replaced storage device from the array for replacement.

3. The hot replacement process of claim 1 wherein all of the requests that are generated by the host computer while the to-be-replaced storage device is being replaced are buffered and deferred.

4. The hot replacement process of claim 1 wherein a software driver is used to effectuate a portion of said process.

5. The hot replacement process of claim 4 wherein the software driver is loaded in the host computer.

6. The hot replacement process of claim 4 wherein the software driver is loaded in the storage array.

7. The hot replacement process of claim 1 wherein each of the storage devices is a hard disk drive.

8. A data storage and retrieval system, comprising:
    a) an array of data storage devices serially connected to one another for receiving requests for the storage or retrieval of data from a computer;
    b) a buffer for buffering the requests from the computer; and c) a processor associated with said buffer and said array for:
  i) causing said buffer to buffer the requests from the computer while one of said storage devices is being replaced;
  ii) causing the processing of the requests to be deferred while they are being buffered; and
  iii) causing the buffered requests to be processed after the storage device has been replaced.

9. The system of claim 8 further including a replace device notifier for notifying when it is safe to remove the storage device from the array and wherein said processor further:
  a) receives a signal that the storage device is about to be replaced;
  b) causes any request that is in the process of being fulfilled at the time of the signaling to be completed; and
  c) after any request that was in the process of being fulfilled at the time of the signaling to be completed:
    i) initiates
      a) the buffering of the requests by said buffer; and
      b) the deferring of the processing of the requests; and
    ii) causes the notifier to notify that it is safe to remove the storage device from the array.

10. The system of claim 8 wherein said processor also causes all of the requests that are received from the computer while the storage device is being replaced to be buffered and deferred.

11. The system of claim 8 wherein said processor includes a software driver.

12. The system of claim 11 wherein said software driver is configured to be loaded in the computer.

13. The system of claim 11 wherein said software driver is configured to be loaded in said array.

14. A data storage device containing a software driver configured after installation to cause:
  a) the buffering of requests from a computer to read or write data to an array of data storage devices serially connected to one another while one of the storage devices is being replaced;
  b) the processing of the requests to be defer red while they are being buffered; and
  c) the processing of the buffered requests after the storage device has been replaced.

15. A hot replacement process for replacing a to-be-replaced component in a data storage device while the device continues to receive requests for the storage or retrieval of data from a host computer to which the device is connected, comprising:
  a) buffering the requests while the to-be-replaced component is being replaced;
  b) deferring the processing of the requests while they are being buffered;
  c) replacing the to-be-replaced component with another component while the requests are being buffered; and
  d) processing the buffered requests after the to-be-replaced component has been replaced.

16. A data storage and retrieval system comprising:
  a) a data storage device for receiving requests for the storage or retrieval of data from a computer, said device including a component necessary for the operation of said device;
  b) a buffer for buffering the requests from the computer; and
  c) a processor associated with said buffer and said device for:
    i) causing said buffer to buffer the requests from the computer while said component is being replaced;
    ii) causing the processing of requests to be deferred while they are being buffered; and
    iii) causing the buffered requests to be processed after said component has been replaced.

* * * * *